United States Patent
Schireson (10) Patent No.: US 7,853,528 B2
(45) Date of Patent: Dec. 14, 2010

(54) E-COMMERCE STORE MANAGEMENT USER INTERFACE FOR PERFORMING WEB SITE UPDATES

(75) Inventor: Max Schireson, Los Altos, CA (US)

(73) Assignee: Oracle International Corporation, Redwood Shores, CA (US)

(*) Notice: Subject to any disclaimer, the term of this patent is extended or adjusted under 35 U.S.C. 154(b) by 593 days.

(21) Appl. No.: 10/071,945

(22) Filed: Feb. 5, 2002

(65) Prior Publication Data

US 2009/0077670 A1    Mar. 19, 2009

(51) Int. Cl.
*G06F 21/22* (2006.01)
(52) U.S. Cl. .......................................... 705/51; 713/166
(58) Field of Classification Search ............. 705/26–29, 705/50–54, 56, 64, 75; 713/164–170, 182–185; 707/1–10, 100–104, 658, 705, 709–711
See application file for complete search history.

(56) References Cited

U.S. PATENT DOCUMENTS

| | | | | |
|---|---|---|---|---|
| 6,029,041 A | * | 2/2000 | Takano et al. ............... | 399/388 |
| 6,128,600 A | * | 10/2000 | Imamura et al. .............. | 705/27 |
| 6,192,361 B1 | * | 2/2001 | Huang ........................... | 707/9 |
| 6,442,592 B1 | * | 8/2002 | Alumbaugh et al. ......... | 709/206 |
| 6,556,975 B1 | * | 4/2003 | Wittsche ....................... | 705/26 |

(Continued)

FOREIGN PATENT DOCUMENTS

JP        06131226 A    *    5/1994

OTHER PUBLICATIONS

Stein, Lincoln, "Weaving a Secure Web. (Web Page Security)", Sep. 1997, Security Management, v41, n9, p. 72(8).*

*Primary Examiner*—Mary Cheung
(74) *Attorney, Agent, or Firm*—Townsend and Townsend and Crew LLP (57) ABSTRACT

A method for an e-commerce storefront management user interface to enable efficient updating of the Web pages of the storefront. The method begins with the step of accessing a Web page out of a plurality of Web pages of an e-commerce Web site. Log in information is then submitted to the Web site. The log in information can include an authentication to obtain privileges for modifying the Web pages of the Web site. Once logged in, an item on the Web page is selected for editing and modification. The selected item is then edited and the edited data is submitted. Once received by the Web site, an updated version of the Web page is provided for viewing and verification of the edited item. The steps are performed using a Web browser on a client machine to access the Web site and view the Web pages. The logged in manager can be required to log out of the Web site prior to receiving the updated version of the Web page. The updated version of the Web page is viewed using a Web browser to verify the appearance of the edited item, the appearance being the same as the appearance to a standard user accessing the updated version of the Web page. A workflow notification request can be automatically generated in order to obtain an approval of the updated version of the Web page, wherein the updated version of the Web page is not provided until the approval is obtained.

15 Claims, 4 Drawing Sheets

U.S. PATENT DOCUMENTS

| | | | |
|---|---|---|---|
| 6,629,135 B1 * | 9/2003 | Ross et al. | 709/218 |
| 6,643,663 B1 * | 11/2003 | Dabney et al. | 707/102 |
| 6,684,369 B1 * | 1/2004 | Bernardo et al. | 715/513 |
| 6,745,238 B1 * | 6/2004 | Giljum et al. | 709/219 |
| 6,785,721 B1 * | 8/2004 | Immerman et al. | 709/220 |
| 7,103,605 B1 * | 9/2006 | Hazi et al. | 707/102 |
| 2001/0034667 A1 * | 10/2001 | Petersen | 705/27 |
| 2001/0049672 A1 * | 12/2001 | Moore et al. | 707/1 |
| 2002/0002513 A1 * | 1/2002 | Chiasson | 705/27 |
| 2002/0046244 A1 * | 4/2002 | Bimson et al. | 709/205 |
| 2006/0031927 A1 * | 2/2006 | Mizuno et al. | 726/11 |

* cited by examiner

E-COMMERCE STORE MANAGEMENT USER INTERFACE FOR PERFORMING WEB SITE UPDATES

FIELD OF THE INVENTION

The field of the present invention pertains to the management of Web pages on a distributed computer network. More particularly, the present invention relates to a method and system for implementing an e-commerce store management user interface for performing Web page updates and changes on an e-commerce Internet site.

BACKGROUND OF THE INVENTION

One of the most important societal changes of recent times has been the emergence of the Internet, more particularly, the World Wide Web (e.g., the Web), as a predominant communications medium. The Web presents a navigable aggregation of Web page content of all the Web connected computers. This navigable aggregation content is linked in such a way as to offer users access to information and documentation, typically in the form of interactive hypermedia, or Web pages. Web pages describe documents in which hypertext links are used connecting a multitude of combinations of graphics, audio, video, and text. Such combinations are often interlinked and interconnected in nonlinear, nonsequential manners.

With the widespread emergence of Internet communications technologies (e.g., the Web), a variety of electronic commerce facilitating schemes were developed. One such scheme involved the use of dedicated Web sites for implementing business-to-business and business-to-consumer buying and selling exchanges on the Internet. The term "electronic commerce" or "e-commerce" originally evolved from remote forms of electronic shopping to mean all aspects of business and market processes enabled by wide area communications networks, namely, the Internet and the World Wide Web based network technologies. E-commerce is a rapidly growing field, and is generally understood to mean doing business on-line or selling and buying products and services through Web (e.g., Internet based) storefronts or through other similar distributed computer networks. In general, electronic commerce is in many ways similar to the more traditional catalog based commerce schemes. The e-commerce exchanges, or e-commerce "storefronts", have evolved to focus on the specific needs and requirements of buying and selling via one or more Web sites on the Internet.

As the use of e-commerce storefronts have proliferated, increasing amounts of effort and resources are dedicated towards the implementation and maintenance of the numerous Web pages that actually comprise the storefronts. For example, many e-commerce storefronts resemble a form of electronic commerce catalog based buying and selling, or simply electronic catalogs, wherein the user progresses through a series of related Web pages, examining various aspects of articles being considered for purchase. The various types of electronic commerce "catalog-type" Web sites has become a preferred method of efficiently making available in large number of goods and services to a large number of potential buyers. Electronic catalogs provide a convenient means for aggregating large number of potential items for sale and efficiently disseminating information about these items to a large number of potential buyers. However, updating information about the various articles for sale, such as, for example, prices, styles, features, and the like, requires the updating and editing of the numerous Web pages that comprise the Web site storefronts.

In accordance with the prior art, the maintenance of an e-commerce storefront is a specialized task requiring specialized skills and tools. For example, Web site maintenance or updates are usually performed by skilled Web page authors trained to use specialized tools. Web page authors use specialized software such as HTML (hypertext markup language), Java, XML (extensible markup language), and the like, to create and/or update Web pages and to format the various hypermedia links, objects, fields, etc., within the Web pages. Web page authors also use a variety of tools to track the structure of the links between the many Web pages that comprise the Web site. The creation and updating of such large Web sites, having many hundreds of complex interlinked, interrelated Web pages, has become a very technical and manpower intensive undertaking.

Thus, a significant problem exists with regard to the cost-effective management of an e-commerce storefront. The prior art does not provide a store manager user interface which allows the store manager to pick tasks he/she wants to perform (add a product, update product information, change image, change price, etc.) and then allows the user to select the product or product hierarchy to which the changes needs to be applied. The limitation of such changes and updates often requires the rebuilding of the constituent Web pages. Rebuilding Web pages is usually not a cost-effective option. Changes to the hyperlinks of a document, as with changes to the color, tabs, buttons, or the like, often requires completely rebuilding the page. With current Web site authoring tools there exists very tight constraints with regard to the code of the page. It is difficult to simply "cut and paste" changes into the page. Any new hyperlinks have to be verified to ensure the linked to the correct Web pages. Changing hyperlinks introduces the possibility of "breaking" existing hyperlinks from other connected documents. Thus, it becomes expensive to implement changes to, for example, respond to competitors. It becomes expensive to quickly modify a user flow in response to changes in the products.

In addition, any changes which are made have to be verified by accessing the selling via a customer style Web browser in order for the store manager to see exactly what the customer sees. Verification is required in order to ensure the updates having carried out correctly. Mistakes require a new iteration of updates/changes and subsequent re-verification.

Thus, what is required is a solution that allows the easy updating of e-commerce storefront information. The required solution should allow a store manager to change product information (e.g., price, product images, feature information, etc.) in an intuitive manner. The required solution should allow immediate verification of any changes made. The present invention provides a novel solution to the above requirements.

SUMMARY OF THE INVENTION

Embodiments of the present invention provide a solution that allows the easy updating of e-commerce storefront information. The solution of the present invention allows a store manager to change product information (e.g., price, product images, feature information, etc.) in an intuitive manner. The solution of the present invention allows immediate verification of any changes made.

In one embodiment, the present invention is implemented as a computer implemented, web browser based, e-commerce storefront management user interface to enable efficient updating of the Web pages of the storefront. The update method begins with the step of accessing a Web page out of a plurality of Web pages of an e-commerce Web site. Log in information is then submitted to the Web site. The log in information can include an authentication to obtain privileges for modifying the Web pages of the Web site. Once logged in, an item on the Web page is selected for editing and modification. The selected item is then edited and the edited data is submitted to the Web site. Once received by the Web site, an updated version of the Web page is provided for viewing and verification of the edited item.

The user interface is a web browser based user interface executing on a client machine to access the Web site and view the Web pages. The update method can further include the step of logging out of the Web site prior to receiving the updated version of the Web page. The updated version of the Web page is viewed using a web browser on a client machine to verify the appearance of the edited item, the appearance being the same as the appearance to a standard user accessing the updated version of the Web page. A hierarchy of privilege levels can be maintained, such that separate authentications are required to obtain a first and second privilege levels for editing the Web page, wherein the second privilege level is higher than the first privilege level for modifying a greater number of items of the Web page than the first privilege level.

A workflow notification request can be automatically generated by the Web site in order to obtain an approval of the updated version of the Web page, wherein the updated version of the Web page is not provided until the approval is obtained. For example, managers having a lower privilege level can modify numerous items of the Web page, without having the modify items "go live" until they are approved by a manager having a higher privilege level.

In this manner, e-commerce storefront management user interface allows a manager to easily update the e-commerce storefront information, for example, in response to changing market conditions. The user interface allows a store manager to change product information (e.g., price, product images, feature information, etc.) in an intuitive manner, and immediately verify any changes made.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed towards a computer implemented method for the updating and maintenance of e-commerce storefront information. The present invention allows a store manager to change product information (e.g., price, product images, feature information, etc.) in an intuitive manner. The present invention allows immediate verification of any changes made. The present invention and its benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

Figure 1:
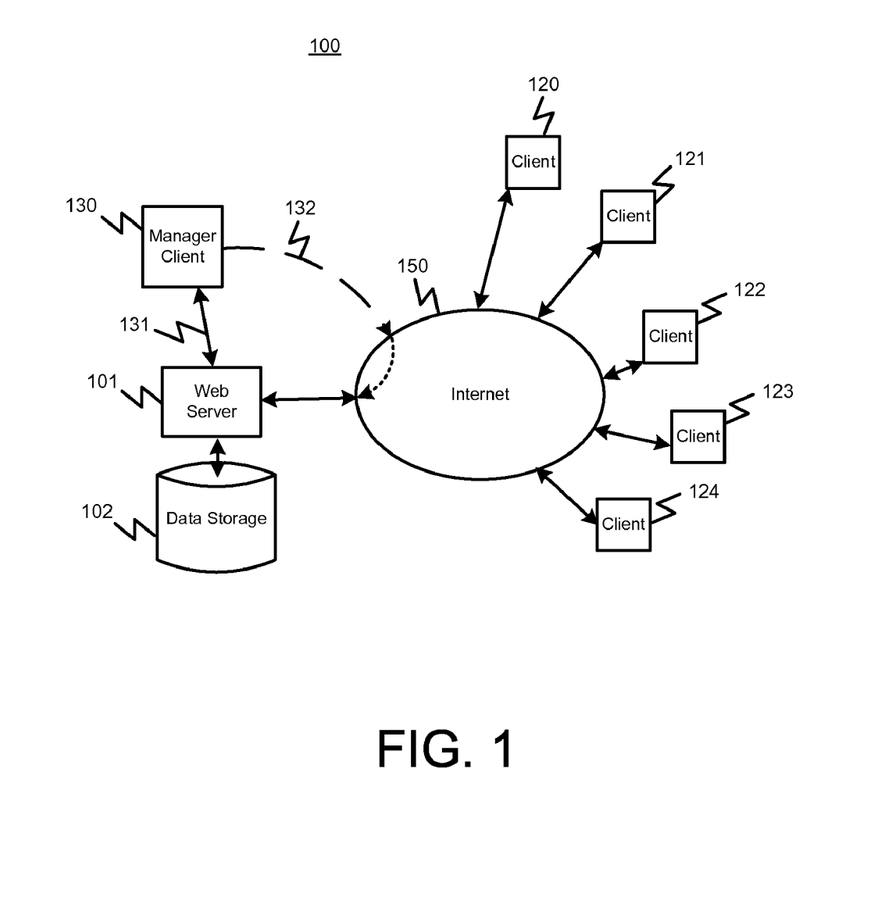
FIG. 1 shows a diagram of an electronic commerce Web site in accordance with one embodiment of the present invention.

Referring now to FIG. 1, a diagram of an electronic commerce Web site storefront system 100 in accordance with one embodiment of the present invention is shown. As depicted in FIG. 1, system 100 includes an e-commerce exchange server host, hereafter Web server 101, communicatively coupled to a plurality of customer clients 120-124 via a distributed computer network, hereafter Internet 150. Web server 101 is also coupled to a manager client 130 via a dedicated link 131.

The Web server 101 functions as the central communications point for the e-commerce operations of the storefront system 100. Web server 101 hosts e-commerce operations by, for example, conducting data collection and management of product information (e.g., items, services, or the like), maintaining credit information for the various clients 120-124, performing billing and debit operations, and the like. The clients 120-124 communicate with Web server 101 via the communications protocols of the Internet 150 (e.g., HTML, PPP, XSL, etc.). Web server 101 maintains information with regard to the various products for sale, buyer information, and the like, via data stored system 102 (e.g., typically a large database).

Referring still to FIG. 1, in accordance with the present embodiment, Web server 101 implements the method for implementing catalog inventory auctions hosted on system 100 in conjunction with manager client 130. In the present embodiment, manager client 130 is used to implement a web browser based, e-commerce storefront management user interface to enable efficient updating of the Web pages of the storefront maintained on Web server 101.

To update the Web pages of the storefront, the manager, or Web master, etc., accesses Web pages of Web server 101, in this case, via an "intranet" link 131. The user interface is a web browser based user interface executing on client machine 130 to access the Web site and view the Web pages maintained by Web server 101. Log in information is then submitted to the Web site (e.g., Web server 101). The log in information can include an authentication to obtain privileges for modifying the Web pages of the Web site. For example, a password can be transmitted to Web server 101 in order to log on as an "administrator" having administrator privileges with regard to editing the Web pages. Once logged in, an item on the Web page is selected for editing and modification. The selected item is then edited and the edited data is submitted to the Web site via the intranet link 131.

An updated version of the Web page is provided for viewing and verification of the edited item via an Internet communications link 132 which functions in the same manner as the communications links of clients 120-124. This allows manager client 130 to visually verify the appearance of the updated Web page. By accessing the updated Web page via the Internet link 132 in the same manner as clients 120-124, the manager can verify the correct appearance of the updated Web page with a high degree of confidence.

Referring still to FIG. 1, the update method preferably includes the step of logging out of the Web site prior to receiving the updated version of the Web page. A hierarchy of privilege levels are preferably maintained, such that separate authentications are required to obtain a first and second privilege levels for editing the Web page, wherein the second privilege level is higher than the first privilege level for modifying a greater number of items of the Web page than the first privilege level.

A workflow notification request may be automatically generated by the Web site in order to obtain an approval of the updated version of the Web page, wherein the updated version of the Web page is not provided until the approval is obtained. For example, managers having a lower privilege level can modify numerous items of the Web page, without having the modify items "go live" until they are approved by a manager having a higher privilege level.

Figure 2:
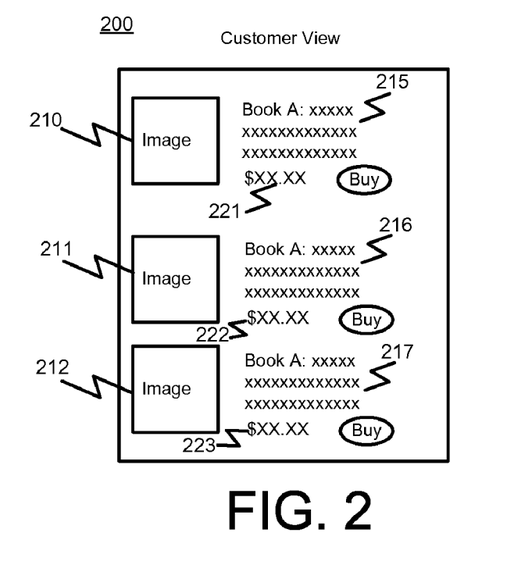
FIG. 2 shows a diagram of a customer view of a Web page in accordance with one embodiment of the present invention.

Referring now to FIG. 2, a diagram of the Web page 200 is shown. As depicted in FIG. 2, Web page 200 shows images of three books being presented for purchase by customer, Book A, Book B, and Book C, each having a corresponding image 210-212, description 215-217, and price 221-223. Web page 200 shows the customer view image of the Web page as it would appear on the Web browsers of clients 120-124. This is the same view of the Web page 200 as seen by the manager client 130.

As described above, to update the Web pages of the storefront, the manager, or Web master, etc., accesses Web pages of Web server 101, in this case, Web page 200. The manager/Web master then submits log in information including an authentication (e.g., password, etc.) to obtain administrator/modification privileges for modifying Web page 200. Once logged in, an item on the Web page is selected for editing and modification.

Figure 3:
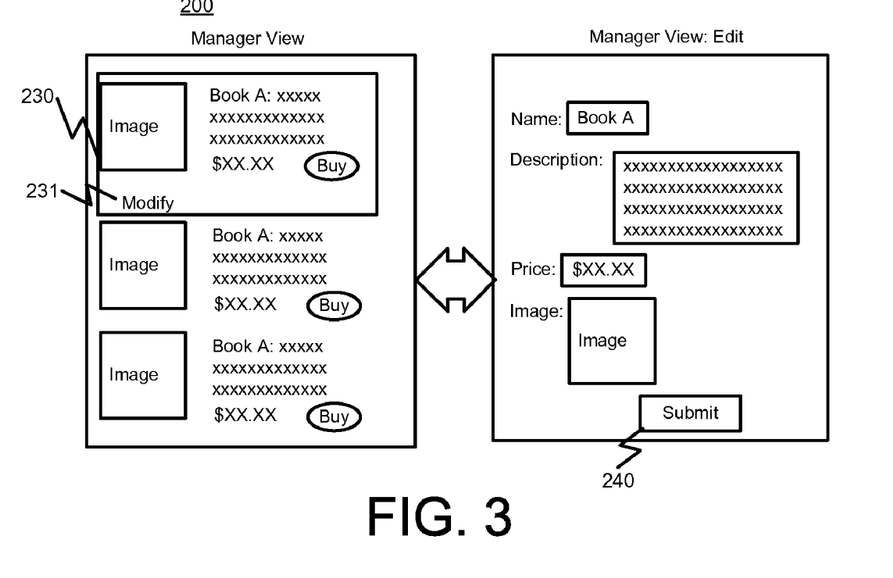
FIG. 3 shows a manager view of Web page after an item has been selected for modification by the manager and a manager editing view of Web page wherein the selected item is changed/modified.

FIG. 3 shows a manager view of Web page 200 after an item has been selected for modification by the manager and a manager editing view of Web page 200 wherein the selected item is changed/modified.

As depicted on the left side of FIG. 3 in the manager view, the manager/Web master has highlighted Book A, the selected item, for editing. In this embodiment, this is shown by the highlighted box 230 encompassing Book A. Once highlighted, a modify button 231 can be actuated (e.g., via mouse or other pointing device).

Once modify button 231 is actuated, the manager view changes to the manager edit view shown on the right hand side of FIG. 3. In this view, the various attributes of Book A can be changed. In this example, attributes include the name of the book, the description of the book, the price, and the representative image. Once changes are made, the manager presses a submit button 240 to submit the changes to the Web server 101.

Web server 101, upon receiving the submitted changes, generates an updated Web page. The update Web page can be viewed by the manager client 130 via the intranet link 131 or, preferably, via the Internet link 132. The update Web page will appear as the customer view Web page 200 shown in FIG. 2, allowing the manager to visually verify the correctness of any changes made in the manager edit view shown in FIG. 3.

Figure 4:
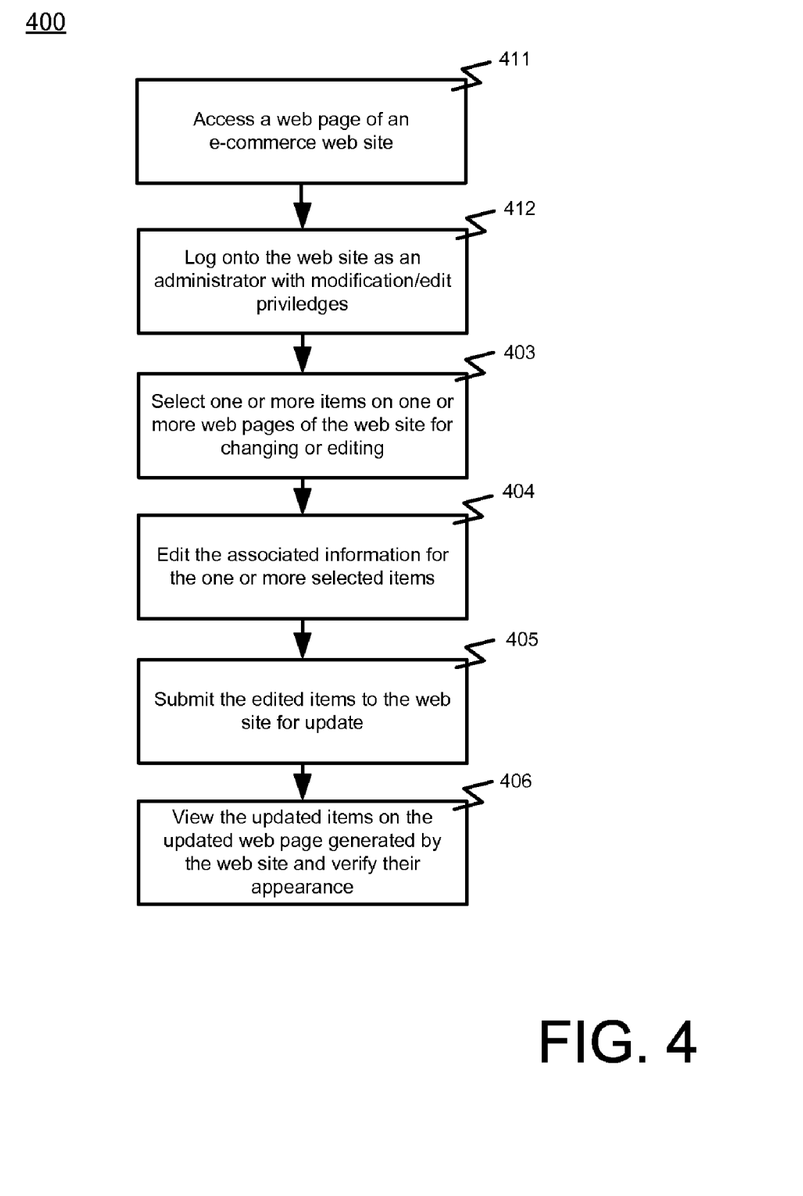
FIG. 4 shows a flowchart of the steps of an e-commerce storefront management user interface update process in accordance with one embodiment of the present invention is shown.

Referring now to FIG. 4, a flowchart of the steps of an e-commerce storefront management user interface update process 400 in accordance with one embodiment of the present invention is shown. Process 400 shows steps involved in accessing the Web pages of an e-commerce storefront Web site and modifying the Web pages in the manner described above.

Process 400 begins in step 401, where a manager accesses the Web pages of the e-commerce Web site. As described above, the manager accesses the Web pages (e.g., Web page 200 of FIG. 2) of the Web site (e.g., Web server 101 of FIG. 1) using a client machine running a Web browser (e.g., manager client 130).

In step 402, the manager logs on to Web server 101. As described above, this logon includes an authentication process whereby the manager verifies his/her identity (e.g., password, etc.) to obtain modification/editing privileges for the Web site.

In step 403, using the Web browser interface, the manager locates the specific item to modify on the Web page.

In step 404, once the item is selected, the manager edits the associated information using the Web browser interface.

In step 405, the manager hits the submit button (e.g., submit button 240 of FIG. 3) to submit the changes to the Web site. As described above, a workflow notification request may be automatically generated by the Web site in order to obtain an approval of the updated version of the Web page, wherein the updated version of the Web page is not provided until the approval is obtained.

In step 406, an updated Web page is generated by the Web site (e.g., Web server 101) and the changes made to the Web page are viewed by the manager using the Web browser interface. As described above, an Internet communications link (e.g., communications link 132 of FIG. 1) is preferably used to view the update Web page in the same manner as external clients 120-124. This allows the manager to see the updated Web page as it would appear to the external clients 120-124.

In this manner, e-commerce storefront management user interface allows a manager to easily update the e-commerce storefront information, for example, in response to changing market conditions. The user interface allows a store manager to change product information (e.g., price, product images, feature information, etc.) in an intuitive manner, and immediately verify any changes made.

Computer System Platform

Figure 5:
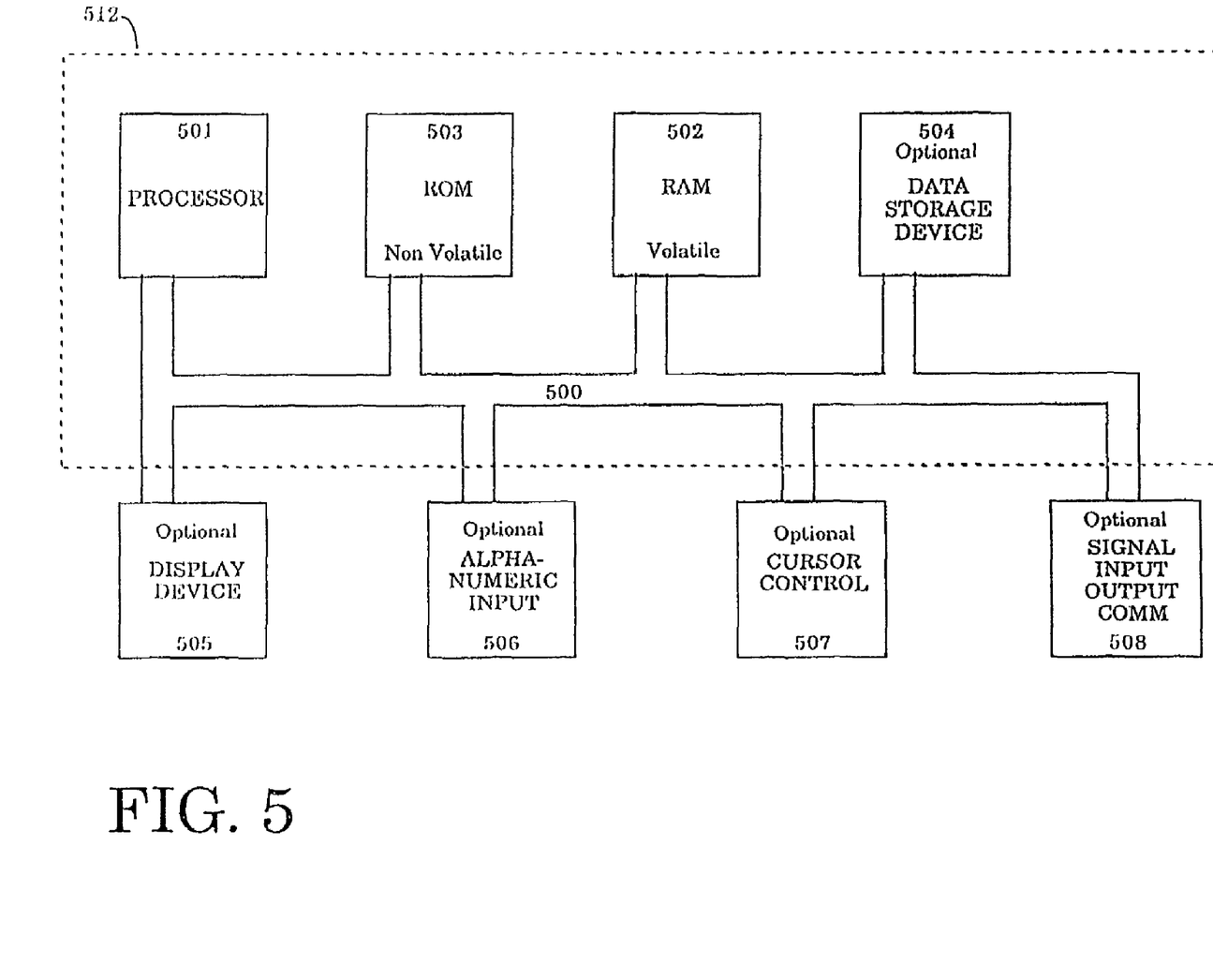
FIG. 5 shows the components of a computer system platform in accordance with one embodiment of the present invention.

With reference now to FIG. 5, a computer system 512 in accordance with one embodiment of the present invention is shown. Computer system 512 shows the components of a computer system in accordance embodiments of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 shows the basic components of a computer system used to implement "server" machines and "client" machines. Computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a signal generating device 508 coupled to the bus 500 for communicating command selections to the processor(s) 501.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of updating Web pages of an e-commerce storefront, the method comprising:

accessing, on a web browser, a Web page out of a plurality of Web pages of an e-commerce Web site over an intranet link the plurality of Web pages of the Web site comprising an electronic catalog of products arranged in a product hierarchy;

submitting log in information to the Web site over the intranet link, wherein said log in information is selected from a first log in information to obtain a first privilege level for editing the Web pages and a second log in information to obtain a second privilege level for editing the Web pages, wherein the second privilege level is higher than the first privilege level, and wherein said intranet link is separate from an Internet communication link;

invoking a web page editor having a graphical user interface for editing the accessed Web page in response to the submitted log in information having a privilege level sufficient to enable editing of the accessed Web page, wherein the web page editor is invoked on the web browser over the intranet link;

selecting an item for sale on the e-commerce website on the Web page to modify, the item having one or more attributes related to the item displayed on the Web page, wherein selecting the item causes the web page editor to display an interface for editing the one or more attributes of the item;

editing the item on the Web page using the graphical user interface to create an updated version of the Web page, wherein editing the item include updating one or more attributes of the item;

submitting the edited item to the Web site over the intranet link;

receiving the updated version of the Web page at a first client over the intranet link, the updated version of the Web page displayed the attributes related to the item, including the one or more updated attributes;

displaying the updated version of the Web page on the web browser of the first client;

viewing the updated version of the Web page using the web browser on the first client to verify the appearance of the edited item, the appearance being the same as the appearance to a standard user accessing the updating version of the Web page; and in response to the login information comprising the first login information, generating a workflow notification to request an approval of the updated version of the Web page from a user having said second privilege level, wherein the updated version of the Web page is not provided over the Internet communication link until the approval is obtained.

2. The method of claim 1, further comprising logging into the Web site with an authentication to obtain privileges for modifying Web pages of the Web site.

3. The method of claim 2 further comprising logging out of the Web site prior to receiving the updated version of the Web page.

4. The method of claims 1, further comprising:
receiving the updated version of the Web page at a second client over the intranet link;
displaying the updated version of the Web page on the web browser of the second client; and
receiving over the intranet link the approval of the updated version of the Web page from the user having the second privilege level.

5. The method of claim 4, further comprising providing the updated version of the Web page over the Internet communication link in response to the approval of the updated version of the Web page from the user having the second privilege level.

6. A computer system comprising a processor coupled to a memory, wherein said memory comprises instructions that when executed on said processor implement a method of updating Web pages of an e-commerce storefront, the method comprising:
accessing, on a web browser, a Web page out of a plurality of Web pages of an e-commerce Web site over an intranet link the plurality of Web pages of the Web site comprising an electronic catalog of products arranged in a product hierarchy;
submitting log in information to the Web site over the intranet link, wherein said log in information is selected from a first log in information to obtain a first privilege level for editing the Web pages and a second log in information to obtain a second privilege level for editing the Web pages, wherein the second privilege level is higher than the first privilege level, and wherein said intranet link is separate from an Internet communication link;
invoking a web page editor having a graphical user interface for editing the accessed Web page in response to the submitted log in information having a privilege level sufficient to enable editing of the accessed Web page, wherein the web page editor is invoked on the web browser over the intranet link;
selecting an item for sale on the e-commerce website on the Web page to modify, the item having one or more attributes related to the item displayed on the Web page, wherein selecting the item causes the web page editor to display an interface for editing the one or more attributes of the item;
editing the item on the Web page using the graphical user interface to create an updated version of the Web page, wherein editing the item include updating one or more attributes of the item;
submitting the edited item to the Web site over the intranet link;
receiving the updated version of the Web page at a first client over the intranet link, the updated version of the Web page displayed the attributes related to the item, including the one or more updated attributes;
displaying the updated version of the Web page on the web browser of the first client;
viewing the updated version of the Web page using the web browser of the first client to verify the appearance of the edited item, the appearance being the same as the appearance to a standard user accessing the updating version of the Web page; and
in response to the login information comprising the first login information, generating a workflow notification to request an approval of the updated version of the Web page from a user having said second privilege level, wherein the updated version of the Web page is not provided over the Internet communication link until the approval is obtained.

7. The computer system of claim 6, further comprising logging into the Web site with an authentication to obtain privileges for modifying Web pages of the Web site.

8. The computer system of claim 7 further comprising logging out of the Web site prior to receiving the updated version of the Web page.

9. The computer system of claims 6, further comprising:
receiving the updated version of the Web page at a second client over the intranet link;
displaying the updated version of the Web page on the web browser of the second client; and
receiving over the intranet link the approval of the updated version of the Web page from the user having the second privilege level.

10. The computer system of claim 9, further comprising providing the updated version of the Web page over the Internet communication link in response to the approval of the updated version of the Web page from the user having the second privilege level.

11. A computer readable media having computer readable instructions embodied therein for causing a computer system to perform a method of updating Web pages of an e-commerce storefront, the method comprising:
accessing, on a web browser, a Web page out of a plurality of Web pages of an e-commerce Web site over an intranet link the plurality of Web pages of the Web site comprising an electronic catalog of products arranged in a product hierarchy;
submitting log in information to the Web site over the intranet link, wherein said log in information is selected from a first log in information to obtain a first privilege level for editing the Web pages and a second log in information to obtain a second privilege level for editing the Web pages, wherein the second privilege level is higher than the first privilege level, and wherein said intranet link is separate from an Internet communication link;
invoking a web page editor having a graphical user interface for editing the accessed Web page in response to the submitted log in information having a privilege level sufficient to enable editing of the accessed Web page, wherein the web page editor is invoked on the web browser over the intranet link;
selecting an item for sale on the e-commerce website on the Web page to modify, the item having one or more attributes related to the item displayed on the Web page, wherein selecting the item causes the web page editor to display an interface for editing the one or more attributes of the item;
editing the item on the Web page using the graphical user interface to create an updated version of the Web page, wherein editing the item include updating one or more attributes of the item;
submitting the edited item to the Web site over the intranet link;
receiving the updated version of the Web page at a first client over the intranet link, the updated version of the Web page displayed the attributes related to the item, including the one or more updated attributes;
displaying the updated version of the Web page on the web browser of the first client;
viewing the updated version of the Web page using the web browser of the first client to verify the appearance of the edited item, the appearance being the same as the appearance to a standard user accessing the updating version of the Web page; and in response to the login information comprising the first login information, generating a workflow notification to request an approval of the updated version of the Web page from a user having said second privilege level, wherein the updated version of the Web page is not provided over the Internet communication link until the approval is obtained.

12. The computer readable media of claim 11, further comprising logging into the Web site with an authentication to obtain privileges for modifying Web pages of the Web site.

13. The computer readable media of claim 12 further comprising logging out of the Web site prior to receiving the updated version of the Web page.

14. The computer readable media of claims 11, further comprising:
- receiving the updated version of the Web page at a second client over the intranet link;
- displaying the updated version of the Web page on the web browser of the second client; and
- receiving over the intranet link the approval of the updated version of the Web page from the user having the second privilege level.

15. The computer readable media of claim 14, further comprising providing the updated version of the Web page over the Internet communication link in response to the approval of the updated version of the Web page from the user have the second privilege level.

* * * * *

UNITED STATES PATENT AND TRADEMARK OFFICE
CERTIFICATE OF CORRECTION

PATENT NO. : 7,853,528 B2  
APPLICATION NO. : 10/071945  
DATED : December 14, 2010  
INVENTOR(S) : Max Schireson Page 1 of 1

It is certified that error appears in the above-identified patent and that said Letters Patent is hereby corrected as shown below:

In column 9, line 1, in claim 4, delete "claims" and insert -- claim --, therefor.

In column 12, line 14, in claim 15, delete "have" and insert -- having --, therefor.

Signed and Sealed this
Ninth Day of August, 2011

David J. Kappos
*Director of the United States Patent and Trademark Office*